Jan. 21, 1936.  T. A. MITCHELL ET AL  2,028,162
METHOD OF MAKING ZINC SULPHIDE
Filed Jan. 8, 1932
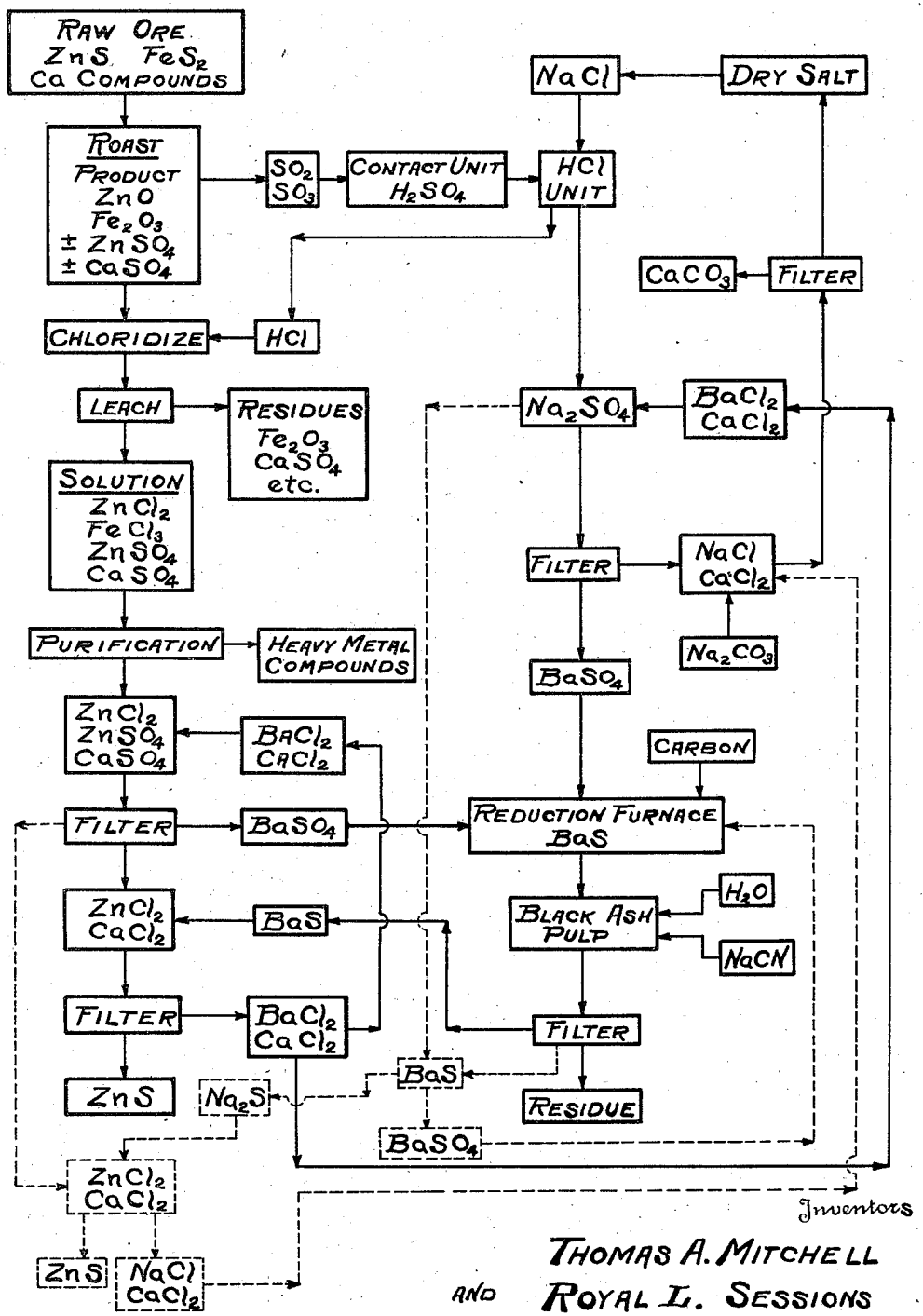
Inventors
THOMAS A. MITCHELL
AND ROYAL L. SESSIONS
By Clayton L. Jenks
Attorney Patented Jan. 21, 1936

2,028,162

UNITED STATES PATENT OFFICE 2,028,162

METHOD OF MAKING ZINC SULPHIDE

Thomas A. Mitchell and Royal L. Sessions, Denver, Colo., assignors, by mesne assignments, to Hughes-Mitchell Processes Incorporated, Denver, Colo., a corporation of Wyoming Application January 8, 1932, Serial No. 585,633

15 Claims. (Cl. 23—135)

This invention relates to the production of zinc sulphide, and more particularly to a cyclic process for producing a commercially pure zinc sulphide which is especially adapted for use as a pigment.

Zinc sulphide may be precipitated from a zinc chloride solution by means of sodium or barium sulphide. It is desirable to employ a cyclic process for this purpose in which the desired product may be produced directly from a zinc bearing ore and particularly a complex pyritic zinc sulphide ore. In such a process, the expense of purifying and concentrating the reagent solutions should be minimized and the purification steps should not introduce undesired elements.

The commercial zinc sulphide produced by the use of barium sulphide is found to contain a large percentage of barium sulphate, the standard grades often running as low as 90% of zinc sulphide. In the course of our experimentation, we have discovered that this barium sulphate contamination is due primarily to the presence of the sulphate radical in the reagent solutions, which may be due, for example, to an initial adjustment of the barium sulphide solution made with sulphuric acid. Also, the zinc chloride solution employed may have been derived by roasting a zinc sulphide ore, with the production of some zinc sulphate as well as oxide. Consequently, chloridizing of the roasted ore may have resulted in the zinc chloride solution being contaminated with some zinc sulphate. We have also found that calcium sulphate, which is slightly soluble in water, is likely to be present in the zinc chloride solution and particularly where a calcium compound may have been present in the original ore or introduced at some stage of the process to accomplish a particular purpose. A weak solution of zinc chloride will contain a higher content of calcium sulphate per unit of zinc chloride therein than will a more concenterated solution. Hence, the weak solution will yield the greater percentage of barium sulphate as an impurity. Hence, from this viewpoint, it would be considered advisable to evaporate the zinc chloride solution to a high strength found most efficient for precipitating zinc sulphide therefrom. This, however, entails an expensive operation which we have found to be unnecessary, since in accordance with our procedure, it is possible to utilize a low strength zinc chloride solution and yet obtain an efficient recovery of zinc sulphide of a satisfactory degree of purity.

It has also been found that a barium sulphide solution tends to hydrolze and dissociate into two components, barium hydrate and barium sulphhydrate, and that if the solution is allowed to stand for any length of time, the quantity of barium hydrate present is greater than the theoretical ratio. Hence, when the solution is mixed with zinc sulphate or zinc chloride, a small amount of zinc hydrate is formed which will be present in the calcined pigment as zinc oxide.

Zinc sulphide has also been produced by precipitation from a chloride or sulphate solution by means of sodium sulphide. One source of sodium sulphide for this purpose has been sodium sulphate which may be derived, for example, from the reaction of zinc sulphate with the sodium sulphide reagents. It has been considered necessary heretofore to evaporate this sodium sulphate solution and then reduce the solid material in a furnace by means of carbon to form sodium sulphide. The sodium sulphide thus produced must be leached from the furnaced material and then crystallized in order to purify it, in accordance with the standard practice heretofore adopted. These operations involving evaporation and crystallization are expensive and the prior process has been one which involved the introduction of impurities at various stages of the process unless expensive steps were taken to avoid this and to purify the various reagents employed.

The primary object of our invention is to avoid such problems and to provide an efficient and economical method of making zinc sulphide of a satisfactory commercial grade of purity by the reaction of barium sulphide on zinc chloride in which the chlorine atom is used repeatedly and cyclically in the system.

It is a further object of our invention to provide a cyclic method of making zinc sulphide directly from a zinc compound, and particularly its ore, in which the introduction of outside impurities to the reaction steps will be largely avoided, and the sulphate radical will be readily eliminated, and in which the necessary purification steps employed to maintain the final product of the desired purity may be simple, inexpensive and easily conducted.

With these and other objects in view, as will be apparent to one skilled in the art, our invention resides in the combination of process steps set forth in the specification and covered by the claims appended hereto. The drawing illustrates diagrammatically the main steps of a process embodying this invention.

This invention is based on what we may term the "barium sulfate and sodium chloride cycle", in which these two compounds re-appear periodically in the process. The cycle is illustrated by the following five equations, in which it will be noted that barium sulphate and sodium chloride both start and end the cycle, zinc sulphide being taken out of process as a finished product and zinc oxide being utilized as the source of zinc. Other materials, such as zinc carbonate or zinc metal, may be substituted for the zinc oxide in Equation 3 without affecting the cycle or departing from the scope of this invention.

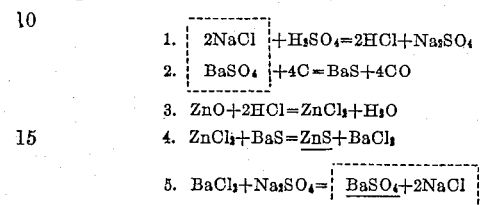

1. $2NaCl + H_2SO_4 = 2HCl + Na_2SO_4$
2. $BaSO_4 + 4C = BaS + 4CO$
3. $ZnO + 2HCl = ZnCl_2 + H_2O$
4. $ZnCl_2 + BaS = ZnS + BaCl_2$
5. $BaCl_2 + Na_2SO_4 = BaSO_4 + 2NaCl$

Equations 1 and 3 represent a process of making zinc chloride from zinc oxide and sulphuric acid, which are derived by roasting zinc sulphide, and the other equations show the formation of zinc sulphide and the regeneration of the barium and sodium reagents for cyclic use. The significance of these steps will be more fully discussed below, but it will be readily apparent that the process may be carried on continuously merely by supplying zinc oxide or metal for the reactions and that the process may be carried on in such a manner as to avoid the introduction of impurities and to eliminate many of the expensive steps heretofore required for the production of zinc sulphide.

While the invention is broadly useful for the production of zinc sulphide from zinc chloride derived from various sources, yet the process is particularly applicable to the treatment of a zinc bearing ore, and especially a sulphide, for making commercially pure zinc sulphide directly therefrom. As indicated by the drawing and the equations, the process may comprise roasting a zinc sulphide ore to form zinc oxide, with or without zinc sulphate, and treating the roasted ore with hydrochloric acid to transpose the zinc oxide to a chloride. Sulphur dioxide and trioxide gases derived from the roasting operation may be employed to form sulphuric acid and this sulphuric acid is treated with sodium chloride derived from the process (Equation 5) for forming the hydrochloric acid (Equation 1) used to develop the zinc chloride (Equation 3). Barium sulphide is formed by reducing barium sulphate in a furnace by means of carbon (Equation 2) and this barium sulphide after suitable purification is employed to precipitate the zinc sulphide from the zinc chloride solution (Equation 4). The barium chloride formed in the reaction is converted to barium sulphate (Equation 5) by means of the sodium sulphate derived from the process of Equation 1, thereby regenerating both barium sulphate and sodium chloride for reuse.

In order to obtain commercially pure zinc sulphide, or one which is free from impurities that are detrimental in pigments, it is necessary that the reagents employed be purified. To this end, it is desirable to avoid the presence of iron compounds as well as the sulphate radical in the zinc chloride solution. Since many types of zinc sulphide ore contain a large content of iron sulphide, we propose to so carry on the process that the iron content is present in the chloridized material as ferric oxide which is insoluble in the leaching solutions ordinarily used for recovering the zinc content of the ore. This is preferably accomplished by heating the chloridized ore with oxygen to a temperature at which ferric or ferrous chloride is not stable and will be converted to ferric oxide. We prefer to carry on the roasting operation in such a manner that the iron sulphide is oxidized to ferric oxide so that the zinc oxide content of the ore may be converted by means of hydrochloric acid to zinc chloride and the iron content of the ore be kept unchloridized. Various other methods may be adopted within the scope of our invention.

Our preferred practice is to roast the ore under oxidizing conditions to convert a considerable portion of the zinc sulphide to zinc oxide and to form ferric oxide. The operation may be of the type known as dead or sweet roasting, but in view of the following disclosure, it will be apparent that the operation may be carried on in accordance with various procedures, depending upon the nature of the ore being treated as well as the end products desired. We, however, prefer to grind the ore material to a powder and to pass it through a rotary tube or a wedge type of roaster provided with stirring devices causing the ore to be suitably agitated and properly presented to the oxidizing atmosphere introduced for the purpose. The material may be heated by means of a gas flame introduced at the outlet end of the roaster or it may be heated autogenously by combustion of the sulphide ingredients of the ore, or by a combination of both sources of heat. The temperature of the roasting operation and the atmospheric conditions will, of course, be controlled, and preferably to keep the mass from sintering or becoming vitreous, which condition tends to hinder the penetration of the ore by the chloridizing gases. It is also desirable to so carry on the roasting operation that the sulphur dioxide and trioxide gases may be recovered for the manufacture of sulphuric acid used to make the hydrochloric acid employed in our cyclic process, this particular part of the procedure being conducted in accordance with standard practice. The roasted ore may contain zinc oxide and zinc sulphate along with ferric oxide and various other ingredients. For the purpose of chloridizing the zinc oxide of the roasted ore, we may employ hydrochloric acid or various other chloridizing agents. It is to be understood that if the zinc content of the ore is not easily chloridized, we may employ such agents as chlorine and ferric chloride for the purpose. Hydrochloric acid gas is preferred for an ore containing zinc oxide, in which case we pass the roasted ore in counterflow relation through a rotary tube or other suitable apparatus containing hydrochloric acid gas in a desired concentration. While various procedures may be adopted to insure that the iron goes with the residue as an insoluble ferric oxide, we may so carry on the process as to convert only a portion of the zinc oxide to a chloride and thus leave the ferric oxide untouched. If a more complete chloridizing operation is desired, then after the material has been chloridized by means of hydrochloric acid, it may be heated in the presence of oxygen to a temperature at which ferric and ferrous chlorides are not stable. By admitting oxygen to the material while it is being thus heated to a temperature of 250° C. or higher, any ferric or ferrous chloride which may have been formed is broken down to form chlorine or hydrochloric acid, and the iron oxide is oxidized to the ferric condition. Then, by leaching the material thus treated with water or other suitable solvent, the zinc chloride may be dissolved therefrom and be substantially free from iron. The heat treatment also serves to dehydrate any silicic acid present and to leave it in an insoluble form which goes with the residual.

It, of course, will be understood that various other procedures may be adopted for removing the iron as well as other undesired ingredients from this zinc chloride solution and particularly to supplement the method described above. For example, treatment of the zinc chloride solution with potassium permanganate and zinc oxide will serve to oxidize any ferrous iron compound present in the solution and precipitate it as ferric hydrate. In the same way, the manganese dioxide is precipitated, both from impurities present in the solution as well as from the potassium permanganate used as the reagent. By filtering the solution and passing the latter over zinc dust, it is thus freed from iron and manganese as well as other metals.

An essential feature of this invention involves the removal of the sulphate radical from the zinc chloride solution. This sulphate may be calcium sulphate due to the presence of calcium compounds in the ore or to the introduction of various calcium compounds during the process for desired purposes. There also may be zinc sulphate in the zinc chloride solution, which is derived either from the roasted ore or from the chloridizing process in which residual zinc sulphide in the roasted ore may serve as a source of sulphur trioxide which in turn reacts with some of the zinc oxide to form a sulphate thereof. In accordance with our invention, we provide a simple procedure for removing the sulphate radical from the solution without introducing any element which may be detrimental. Our preferred reagent is barium chloride. By its use, we precipitate the sulphate radical as barium sulphate which may be filtered from the solution before it is treated with barium sulphide for the manufacture of the pigment.

Considering that the zinc chloride solution contains calcium sulphate in a slight amount, the reactions involving the purification of the solution and the formation of the zinc sulphide may be expressed by the two following equations:

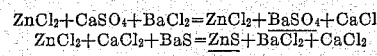

$$ZnCl_2 + CaSO_4 + BaCl_2 = ZnCl_2 + BaSO_4 + CaCl_2$$
$$ZnCl_2 + CaCl_2 + BaS = \underline{ZnS} + BaCl_2 + CaCl_2$$

It will be observed that the calcium and chlorine ions, which were found in the calcium sulphate and the barium chloride, will remain in the solution when the zinc sulphide is precipitated. Since the reagent employed for this elimination of the sulphate radical is barium chloride, then the presence of any barium salt in the resultant solution cannot contaminate the final product with a further undesired element. Calcium chloride is extremely soluble and will go readily with the solution during the precipitating stage. If the sulphate radical is found in zinc sulphate or sulphuric acid, the above reactions will likewise result in the introduction of no detrimental ion into the solution.

It will now be appreciated that this removal of the acid radical of the calcium sulphate from solution makes it possible to employ a dilute zinc chloride solution for making the zinc sulphide without forming a large percentage of barium sulphate in the product. Otherwise, to keep down this barium sulphate content, it would be necessary to use less water for the zinc salt solution and so reduce the total content of soluble calcium sulphate therein. By such methods as these, we obtain a sufficiently pure zinc chloride solution for our purposes.

In accordance with the above steps, we have provided both the zinc and the chlorine ions for the process, and it will be observed by reference to the drawing and the above equations that the chlorid ion found in the zinc salt is carried first to barium and then to sodium and finally to hydrochloric acid for reuse in the process, but that no outside impurities are introduced into the chlorine side of this cycle.

The other half of the cycle relates to the barium reagents. Barium sulphide is the precipitating reagent for making zinc sulphide and it is produced cyclically by reducing barium sulphate in a furnace. This barium sulphate is derived, however, from the barium chloride solution which results when the zinc sulphide is precipitated and from sodium sulphate produced in the process. Hence, if one starts initially with a pure barium compound and if the furnacing operation of reducing the barium sulphate does not introduce impurities, then the process may go on without the introduction of impurities into the cycle of operations. If we assume that the process has been started properly and that a solution of barium chloride has been obtained by precipitation of zinc sulphide from the zinc chloride solution, we then proceed as follows. The barium chloride solution is filter-pressed from the zinc sulphide precipitate, it being observed that it is undesirable to dilute this solution materially by washing the precipitate at this stage in the process. Consequently, the barium chloride is recovered in a strong concentration. This barium chloride solution is then mixed with a solution of sodium sulphate derived in another stage of the process, as indicated on the drawing and by Equation #1, and we thus obtain barium sulphate as a precipitate and a solution of sodium chloride. Here again, the barium sulphate is not washed with water but the sodium chloride solution is filter-pressed from it and may be returned to process as a strong solution, such as 50% so that the cost of evaporating the water from the salt used in the hydrochloric acid machine is thus reduced. The barium sulphate may then be washed or otherwise suitably treated to remove the salt solution therefrom, after which it is dried and then charged into a furnace with the required reducing agents for producing barium sulphide.

This procedure involves making an intimate mixture of finely divided barium sulphate with coal proportioned slightly in excess of the theoretical amount required to reduce the sulphate to sulphide. We prefer to employ petroleum coke or other iron-free carbon, since the ordinary coal is not sufficiently free from iron. The furnace may be heated internally or externally by a gas flame or other suitable medium in order that the carbon may be employed solely for the reducing operation. This furnacing operation will be carried on in accordance with standard procedure which involves a temperature of 1800° F. or so applied to the material for a few hours.

The barium sulphide may be recovered by leaching the furnace charge with water. It is found that barium sulphide, when dissolved in water, tends to hydrolyze and form $Ba(OH)_2$ and $Ba(SH)_2$. If these remain in their theoretical ratios, then the reaction with zinc chloride will be correct but if, as often happens, the barium hydrate content becomes too great, this results ultimately in the presence of zinc oxide in the calcined product. We propose to eliminate this excess of barium hydrate by the following procedure and otherwise to condition the barium sulphide.

The barium sulphide furnace charge, which is known as "black ash", is pulped with water, and then sodium cyanide is added to the pulp in the proportion of three and one-half pounds of sodium cyanide for each 2000 pounds of the dry black ash which is used. This amount of black ash will produce 196 cubic feet of 12° Baumé barium sulphide solution. There is a slight amount of barium polysulfide in the black ash and it is considered that the sodium cyanide unites with this polysulphide to form barium sulphocyanate together with some free sulphur and hydrogen sulphide. This polysulphide is present in amount sufficient to form enough hydrogen sulphide to react in turn with the barium hydrate present in the pulp and so convert it to barium sulphhydrate. Any free sulphur formed in the pulp by this reaction will, of course, remain with the pulp when the barium sulphide solution is filtered therefrom. Care should be taken to avoid adding too much sodium cyanide, since otherwise the reaction will proceed to form barium sulphide. The desired reaction is believed to be expressed by the following equation:

$$4NaCN + 4BaS_2 = 4BaCNS + 2H_2S + S_2$$

The undesired reaction caused by the addition of too much sodium cyanide is believed to proceed in accordance with the following equation:

$$2NaCN + BaS_2 = BaS + NaCNS$$

The pulp should not be heated when the sodium cyanide is added to it, but it is preferably kept merely warm to the hand.

By thus converting the excess of barium hydrate to the sulphhydrate, we prevent the presence of zinc hydrate in the zinc sulphide precipitate which would later be converted to zinc oxide when the material is calcined in a muffle and so serve to impart a yellow color to the pigment. By treating the pulp instead of the solution, we avoid a filtering step, since the precipitated sulphur remains with the pulp along with any other insoluble material that is present. It will also be appreciated that various other cyanides, such as potassium and ammonium cyanides, may be employed for this reaction, and that such materials are to be considered as the equivalent of the sodium cyanide herein described and claimed. This barium sulphide solution may be purified in accordance with other procedures and to eliminate such impurities as are found undesirable in the process.

We now have commercially pure solutions of barium sulphide and zinc chloride for use in the process. If we start the procedure with pure sodium chloride for reaction with sulphuric acid to produce hydrochloric acid and sodium sulphate, we then have the necessary ingredients for this process which do not permit the introduction of outside impurities. The process may now be carried on practically and continuously. The zinc chloride solution derived from the sulphide ore is treated with barium sulphide and the resultant zinc sulphide has the barium chloride solution removed therefrom in a filter-press. The barium chloride solution is combined with the sodium sulphate solution produced in the manufacture of hydrochloric acid and this results in the precipitation of barium sulphate. The latter is then filter-pressed and dried and then charged into a furnace with the required amount of petroleum coke to produce barium sulphide for re-use. The sodium chloride is returned for making more hydrochloric acid and sodium sulphate. Having thus started the process, it is now merely necessary to supply the zinc chloride, free from iron and the sulphate radical, as well as other undesired ingredients, and to avoid introducing impurities from outside sources, or to purify certain of the reaction products in order to produce zinc sulphide of a satisfactory purity. The calcium and other ions which have been introduced initially as impurities may be removed from the sodium chloride solution prior to the manufacture of the sodium sulphate, for the reasons above explained, as by means of sodium carbonate, or the sodium chloride or sulphate solutions may be otherwise purified.

It is to be further noted that sodium sulphide may be employed to precipitate the zinc sulphide, but that in order to carry on the general cycle above specified, different steps will be introduced in using the barium sulphide to produce sodium sulphide, as shown by the following equations:

1. $2NaCl + H_2SO_4 = 2HCl + Na_2SO_4$
2. $BaSO_4 + 4C = BaS + 4CO$
3. $ZnO + 2HCl = ZnCl_2 + H_2O$
4. $BaS + Na_2SO_4 = BaSO_4 + Na_2S$
5. $ZnCl_2 + Na_2S = 2NaCl + ZnS$

The process may be conducted otherwise as above described. By purifying the barium sulphide solution, we avoid the presence of the hydroxyl ion in the sodium sulphide and a consequent formation of zinc hydrate. The sodium sulphate is not reduced to form the sulphide, hence the problems heretofore met in this step are avoided. As indicated by the above Equation #5, the sodium chloride used in Equation #1 is derived by filter-pressing the zinc sulphide, and care may be taken to make a solution which is in the neighborhood of 50%. Similarly, the sodium sulphide may be filter-pressed from the barium sulphate without further dilution. However, since no soluble sulphates or other undesired compounds are present, the precipitating reactions may be carried on without evaporating the solutions, except as required by any recurring dilution at some stage in the process.

The zinc sulphide precipitate which is thus formed by either of these sets of reactions will be free from iron, as well as barium sulphate and other undesired ingredients, and it may now be treated in accordance with any desired procedure in order to bring it into the desired condition for use as a pigment. This ordinarily involves calcining the material at a suitable temperature to remove the water of crystallization. If desired, the material may be treated with suitable agents to increase its alkalinity or otherwise render it easily dispersable in oils for use as a paint. If there is undesired occluded chloridion on the zinc sulphide, then this may be eliminated in accordance with a desired procedure, such as by repeatedly washing the zinc sulphide prior to its calcination. It is also to be noted that sulphuric acid may be used supplemental to the sodium cyanide to remove excess barium hydrate from the barium sulphide solution. The amount to be used will be determined by analysis of the solution. The sulphate radical thus added is removed as a precipitate of barium sulphate. The calcium chloride, which is found in the barium chloride solution because of the slight solubility of calcium sulphate in the zinc chloride solution, remains in solution when the mixture is treated with the sodium sulphate. This very small amount of calcium ion may be removed by any suitable method, such as precipitation as a carbonate by means of sodium carbonate and separation from the salt solution by filtration, prior to the use of the latter in making the hydrochloric acid. Hence, the calcium ion does not accumulate in the reagent solutions.

By this invention, we have provided a process for producing zinc sulphide directly from a zinc bearing ore, which is very simple and economical in its various steps and which, because of its cyclic nature, may be employed to produce a very uniform product of high grade and purity. This material is not contaminated with barium sulphate and it is satisfactory for use where a technically pure sulphide is required.

Having thus described our invention, what we claim as new and desire to secure by Letters Patent is:

1. The method of making zinc sulphide characterized by the cyclic use of the elements of sodium chloride and barium sulphate and comprising the chlorine cycle of treating a zinc compound with hydrochloric acid to form zinc chloride, treating the latter in solution with sodium sulphide to precipitate the zinc as a sulphide, removing the resultant sodium chloride solution and producing said hydrochloric acid from the chloridion thereof, and the barium cycle of treating a barium compound with the sodium sulphate, which has been developed in the formation of said hydrochloric acid by the reaction of sulphuric acid and sodium chloride, to form barium sulphate and heating the latter with a reducing agent to form barium sulphide for use in the process.

2. The method of making zinc sulphide comprising the steps of forming zinc chloride by the reaction of hydrochloric acid on zinc oxide, treating the zinc chloride in solution with barium sulphide to form barium chloride and zinc sulphide, regenerating the hydrochloric acid by treatment of the barium chloride solution with sodium sulphate and combining the resultant sodium chloride with sulphuric acid, whereby chloride ions are cyclically used in the formation of the zinc chloride without introducing an undesired element in association with chloridion.

3. The method of claim 2 in which barium chloride is added to the zinc chloride solution of any available concentration in amount required to precipitate any contaminating sulphate radical therein as barium sulphate which is removed from the solution prior to the formation of the zinc sulphide, whereby both the formation and the purification of the zinc sulphide is accomplished by the aid of said chloridion and barium.

4. The method of making zinc sulphide comprising the steps of precipitating zinc sulphide by the reaction of barium sulphide on zinc chloride in solution, treating sodium sulphate from another stage with the barium chloride solution thus formed and producing barium sulphate and sodium chloride in solution, producing said sodium sulphate and hydrochloric acid by the reaction of sulphuric acid on said sodium chloride, forming said zinc chloride by the treatment of zinc oxide with said hydrochloric acid, and heating the barium sulphate with a reducing agent to form barium sulphide for re-use in the process, thereby producing zinc sulphide continuously from zinc oxide by the cyclic use of the elements of barium sulphate and sodium chloride.

5. The method of producing zinc sulphide for use as a pigment from a zinc sulphide ore comprising the steps of roasting the ore under oxidizing conditions to form zinc oxide, treating the roasted ore with a chloridizing agent and deriving therefrom a zinc chloride solution which is contaminated with calcium sulphate, treating the zinc chloride in solution with barium chloride and forming a precipitate of barium sulphate derived from the contaminating sulphate radical, removing the purified zinc chloride solution and without concentration thereof treating it with barium sulphide to form zinc sulphide, which is thus made free from calcium, barium and the sulphate radical.

6. The method of claim 4 in which the zinc chloride solution is treated with barium chloride to precipitate any contaminating sulphate radical as barium sulphate, and then filter-pressed from the barium sulphate and treated as a weak solution with the barium sulphide to form zinc sulphide free from barium sulphate.

7. The method of making zinc sulphide according to claim 4, in which the barium chloride solution derived from the reaction of zinc chloride and barium sulphide is removed without material dilution and treated with the sodium sulphate derived from the manufacture of hydrochloric acid, and the resultant sodium chloride solution is separated from the barium sulphate precipitate without material dilution, whereby the necessity for evaporating said reagent solutions is minimized.

8. The method of claim 1 in which sodium sulphide is formed by the reaction of the barium sulphide in solution on the sodium sulfate derived from the manufacture of hydrochloric acid, and the sodium sulphide solution thus formed is recovered without material dilution and added to the zinc chloride solution to precipitate zinc sulphide therefrom.

9. The method of making zinc sulphide comprising the steps of treating zinc chloride with sodium sulphide and forming zinc sulphide and sodium chloride, forming sodium sulphate by treatment of the resultant sodium chloride with sulphuric acid, then transposing the sulphate ion to barium sulphate by the reaction of said sodium sulphate and barium sulphide and regenerating sodium sulphide, and heating the barium sulphate with a reducing agent to form said barium sulphide, whereby sodium sulphide is produced indirectly from sodium sulphate without evaporation of its solution and reduction thereof.

10. The method of making zinc sulphide characterized by the cyclic use of the ions of barium sulphate and sodium chloride in solution and comprising the chlorine cycle of treating a zinc compound with hydrochloric acid to form zinc chloride, treating the latter in solution with barium sulphide to precipitate zinc sulphide and form barium chloride in solution, removing the resultant solution without material dilution and treating it with sodium sulphate to form a sodium chloride solution and barium sulphate precipitate, separating said sodium chloride solution from the precipitate and treating the sodium chloride thereof with sulphuric acid to generate said hydrochloric acid and reform sodium sulphate for use in the cycle, and comprising the barium cycle of heating said barium sulphate with a reducing agent to form barium sulphide and returning said barium sulphide to precipitate more zinc sulphide from a chloride solution, after which the resultant barium ion in solution is again precipitated as barium sulphate for reuse.

11. The method of claim 10 in which the zinc chloride solution is contaminated with alkaline earth metal sulphate, comprising the steps of precipitating the sulphate ion from the solution by the addition thereto of barium chloride, and thereafter removing the alkaline earth metal ion in solution and preventing its accumulation in the system by first removing the barium ion from the contaminated barium chloride solution by precipitation as barium sulphate and thereafter precipitating the alkaline earth metal from solution by the addition of sodium carbonate and removing the precipitate prior to the formation of the hydrochloric acid.

12. The method of making zinc sulphide from a zinc chloride solution contaminated with an alkaline earth metal ion comprising the steps of claim 9 and treating the sodium chloride solution with sodium carbonate and separating from the solution any precipitate of alkaline earth metal carbonate, so that the alkaline earth metal impurity will not accumulate in the system.

13. The cyclic process of making zinc sulphide from a solution of zinc chloride of any desired concentration but which is contaminated with the sulphate radical, comprising the steps of adding barium chloride initially to the zinc chloride in amount sufficient to precipitate the sulphate radical as barium sulphate, filtering and removing the zinc chloride solution, treating the solution with barium sulphide to precipitate the zinc as a sulphide, separating the barium chloride solution without material dilution, treating the barium chloride solution with sodium sulphate to precipitate barium sulphate, heating the barium sulphate with a reducing agent to form barium sulphide, returning the barium sulphide to precipitate further zinc sulphide from the purified zinc chloride solution and returning barium chloride in solution to purify a further amount of zinc chloride.

14. The method of making zinc sulphide comprising the steps of dissolving barium sulphide in water, adjusting the solution to remove any excess of barium hydrate over that required for the normal ratio of hydrate to sulphhydrate, treating a solution of zinc chloride, which is contaminated with the sulphate radical, with barium chloride to precipitate the sulphate radical as barium sulphate, removing said precipitate and combining the adjusted barium sulphide and the purified zinc chloride solutions and thereby precipitating zinc sulphide free from barium sulphate and zinc hydrate, and recovering said zinc sulphide.

15. The method of claim 10 in which the original zinc chloride solution is contaminated with alkaline earth metal ions and these ions are found in the sodium chloride solution after precipitation of the barium sulphate comprising the steps of treating the sodium chloride solution with sodium carbonate and precipitating said ions as alkaline earth metal carbonate and then removing the precipitate, and thereby preventing the accumulation of said ions in the system.

THOMAS A. MITCHELL.
ROYAL L. SESSIONS.